June 11, 1963  F. H. INDERWIESEN  3,093,743
RESONANT REED FREQUENCY SENSITIVE CONTROL APPARATUS
Filed Nov. 16, 1960  3 Sheets-Sheet 1

INVENTORS.
Frank H. Inderwiesen
BY
Hovey, Schmidt, Johnson & Hovey
ATTORNEYS

June 11, 1963 F. H. INDERWIESEN 3,093,743
RESONANT REED FREQUENCY SENSITIVE CONTROL APPARATUS
Filed Nov. 16, 1960 3 Sheets-Sheet 2

INVENTOR.
Frank H. Inderwiesen
BY
Hovey, Schmidt, Johnson & Hovey
ATTORNEYS.

June 11, 1963  F. H. INDERWIESEN  3,093,743
RESONANT REED FREQUENCY SENSITIVE CONTROL APPARATUS
Filed Nov. 16, 1960  3 Sheets-Sheet 3

INVENTORS.
Frank H. Inderwiesen
BY
Hovey, Schmidt, Johnson & Hovey
ATTORNEYS

United States Patent Office 3,093,743
Patented June 11, 1963

1

3,093,743
RESONANT REED FREQUENCY SENSITIVE
CONTROL APPARATUS
Frank H. Inderwiesen, Prairie Village, Kans., assignor, by mesne assignments, to J-B-T Instruments, Inc., New Haven, Conn., a corporation
Filed Nov. 16, 1960, Ser. No. 69,670
6 Claims. (Cl. 250—232)

This invention relates to apparatus for controlling an electrical circuit. More specifically, the invention contemplates apparatus having frequency sensitive characteristics which may be actuated by energization applied thereto to control the electrical condition of an output circuit.

The apparatus contemplated by the invention employs a resonant reed which can be electromagnetically driven into vibration when alternating current signals of frequency corresponding to the natural mechanical resonance of the reed are applied thereto. The apparatus is adapted for performing various types of what may be broadly termed electrical control functions, including switching, frequency selective filtering, frequency control of oscillators, and the like.

It is known that electromagnetically excited resonant reed devices, commonly known as resonant reed relays, have heretofore been employed for performing switching functions, although such devices are not adapted for many of the other functions which can be effectively performed by the apparatus of the present invention. Moreover, it should be pointed out that resonant reed relay devices as heretofore known and constructed, have employed the principle of utilizing the resonant reed as a movable electrical contact or as the means for carrying a movable electrical contact which is adapted to physically engage, and thereby make an electrical connection with, one or more stationary electrical contacts when the reed portion of the device is excited into vibration at its resonant frequency. Such constructions have involved a number of inherent disadvantages, for example, the wear which occurs upon the electrical contact surfaces during use both from the physical engagement and from the electrical arcing that tends to occur during the making and breaking of the electrical connection as the reed vibrates, and possibly even more significantly in that it affects the operation of even a new resonant reed relay of conventional design, the fact that well adjusted resonant reed relays effect an electrical connection between the movable and the stationary contacts thereof during only a minor fraction of the entire period of one vibration cycle, so that the control switching connection sought to be accomplished is achieved only to a limited extent and with very low efficiency attended by the undesirable generation of switching transients.

Accordingly, it is one of the primary objects of this invention to provide electrical control apparatus which retains the frequency sensitive characteristics of the mechanically resonant, vibrating reed, while eliminating the disadvantages inherent in conventional constructions where such resonant reeds are used to physically move electrical contact surfaces into and out of engagement with each other.

Another of the primary objects of the invention is to provide such improved control apparatus utilizing a mechanically resonant reed which will be adapted not only for the more efficient performance of electrical switching functions, but which will also be adapted for efficiently performing a variety of other electrical control functions such as filtering, frequency control and the like.

Another important object of the invention is to provide such control apparatus having a mechanically resonant vibrating reed, wherein the vibrating reed does not physically engage any solid part or component used in performing the control function, whereby the natural action of the reed during vibration at its resonant frequency will not be damped, modified or otherwise adversely affected, thereby utilizing the maximum sensitivity characteristic inherent in the reed being employed.

Another important object of the invention is to provide such control apparatus in which means carried by the mechanically resonant vibrating reed during vibration thereof, which means may form a part of the reed itself or constitute structure mounted thereon, is employed to alter the condition of continuity of a path being traversed by radiant energy, the apparatus further providing means for detecting changes in the transmission of radiant energy along said path.

Another important object of the invention is to provide control apparatus of the type referred to in which light is used as the radiant energy whose transmission along a given path is controlled by the vibratory condition and position of a resonant reed, and in which a light source is provided to generate the necessary radiations and a photosensitive device is provided to detect changes in the amount of light being permitted by the resonant reed assembly to traverse said path, it being understood that electrical parameters of the photosensitive device which change in accordance with the amount of light applied thereto can then be employed for controlling the electrical condition of an electrical circuit coupled with such photosensitive device.

Other important objects of the invention, including significant details of construction will be made clear or become apparent as the following description of a currently preferred embodiment and certain illustrative modifications thereof proceeds.

Figure 14:
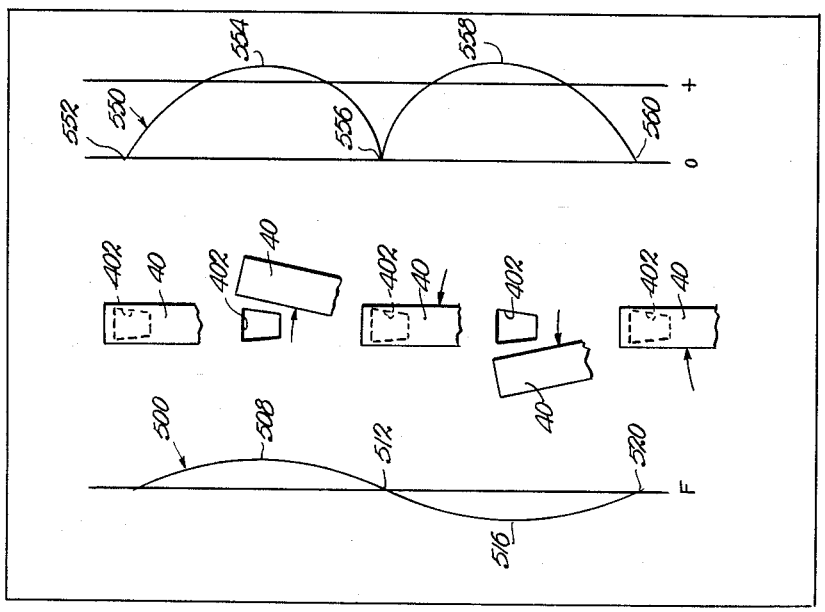
Figure 13:
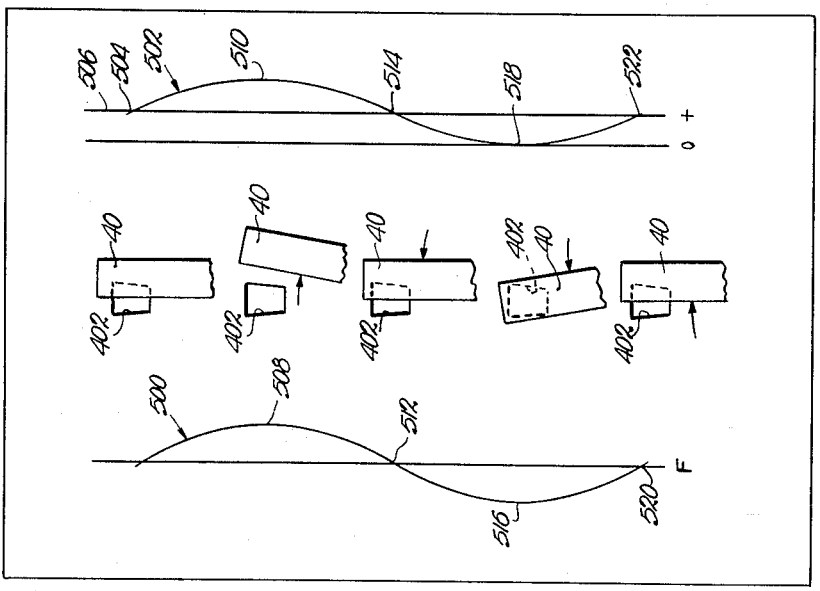

FIG. 13 is a schematical representation illustrating the currently preferred relationship between the opaque portion of the vibrating reed and the path of transmission of light (represented by an aperture in a screen), and also indicating a curve representing the cyclic action of the reed during vibration and a second curve representing the control function output of the apparatus at the same frequency as that of vibration of the resonant reed; and FIG. 14 is a view in all respects similar to FIG. 13, except that a modified relationship between the vibratory reed and the light transmission path is illustrated by which a control function output of frequency equal to twice that of the frequency of vibration of the reed will be obtained.

Figure 1:
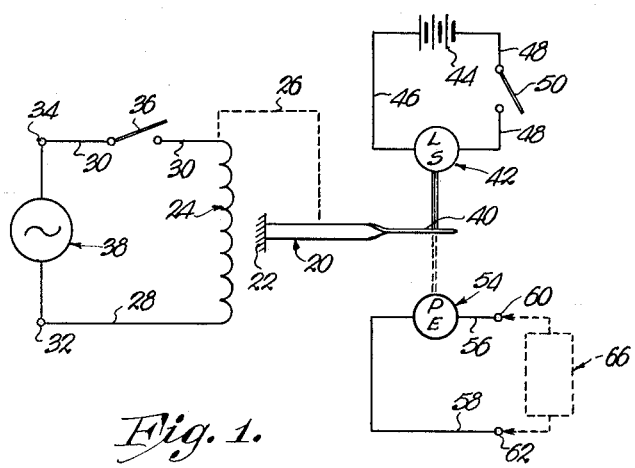
FIG. 1 is a schematic diagram showing the basic electrical, physical and optical relationships between the elements employed in a preferred embodiment of the invention.

Referring now to the drawings and, firstly, particularly to FIG. 1, the apparatus contemplated by the invention includes a mechanically resonant vibratory element generally designated 20 having one end thereof stationarily mounted as at 22 and the remaining length thereof freely oscillatable at the natural resonant frequency defined by the physical characteristics of the element 20, which is normally formed of metal. Element 20 in the currently preferred construction comprises a resilient, strip-like reed of magnetic material, although those skilled in the art will appreciate that other vibratory mechanisms such as a tine of a tuning fork could be used for the element 20. An electromagnet generally represented by the coil 24 is operably coupled, preferably magnetically, as indicated by the dotted line 26 in FIG. 1, with the resonant reed or equivalent element 20 for mechanically oscillating or vibrating the reed 20 when the electromagnet 24 is energized with alternating current signals corresponding in frequency to the resonant frequency of the reed 20. An input or energization circuit 28—30 couples the electromagnet or coil assembly 24 with a pair of input terminals 32 and 34. There is illustrated for possible clarification in later explaining the operation of the apparatus, an on-off switch 36 interposed in series with the conductive means 30 of circuit 28—30, but it will be understood that such switch 36 is not essential.

Any source of energization may, of course, be coupled with the input circuit 28—30 for controlling the vibratory action of the reed 20 through energization of the reed vibrating coil 24, depending upon the type of control function that is to be performed and the nature of the input that is available for controlling the same. It will be understood by those skilled in the art, however, that the normal form of energization for the input circuit 28—30 will comprise signals including an alternating current component of frequency corresponding to the resonant frequency of the reed 20, and that the presence or absence of a signal component of such frequency in the input applied to circuit 28—30 will determine whether or not the coil 24 will be energized at an alternating current frequency effective to induce vibratory oscillations of the reed 20 at its mechanically resonant frequency. Accordingly, such input is represented in FIG. 1 by an alternating current source or generator generally designated 38, which is coupled with the input terminals 32 and 34.

Although the invention is not limited to operation at any particular frequency other than by the limitations upon the mechanically resonant frequencies that may characterize vibratory elements used for providing the reed 20, it may be helpful to observe that a typical range of choice of resonant frequency for the reed 20 would currently extend from about thirty cycles per second to about three thousand cycles per second, although this range may, of course, be extended as techniques for the manufacture of resonant reed elements is improved. Obviously, if it should develop that resonant reeds may be manufactured for operation at other desirable frequencies outside of the normal range of choice permitted by metallic reed elements through the employment of other materials not having magnetic properties, then this invention would contemplate that such a nonmagnetic reed would be provided with a suitable part thereon formed of magnetic material to permit the desired magnetic coupling 26 of such a reed coupling 20 with the coil or other electromagnetic operating means 24. It should also be observed that, as will be hereinafter illustrated, the apparatus contemplated by the invention is adapted for exciting control of electrical circuitry to be controlled at frequencies different from that of the energizing input and the actual physical vibration of the reed 20, this function being particularly convenient to accomplish where the output circuit is to be controlled at some frequency which is harmonically related to the resonant frequency of oscillation of the reed 20.

The vibratory reed 20 is provided with means generally designated 40 carried thereby for movement therewith as the reed 20 oscillates at its resonant frequency. Means 40 may be either integrally formed as a part of the reed 20 or may be operably coupled with the reed 20 as by mounting thereon. Preferably, the means 40, which is to be employed for interrupting a path of travel of radiant energy such as light, will be disposed adjacent the free end of reed 20 in order to have a maximum distance of swing for a given amplitude of vibration of the reed 20. The means 40 has for its essential characteristic that at least a portion of same is adapted to present an impassable barrier to the transmission of the particular type of radiant energy that may be employed in the apparatus. The invention contemplates that various types of radiation might be subject to having the path of travel thereof interrupted by a shiftable means 40 and could, therefore, conceivably be utilized in practicing this invention. For example, X-rays, gamma rays, electronic beams, heat, light rays outside the visible spectrum, and other forms of radiation for which suitable sources of radiation sensitive transducers are available, could be used. However, light is currently regarded as the most convenient, and, therefore, preferred form of radiation to be used in connection with the invention, mainly because it involves no elements of danger to personnel and both sources for light sensitive transducers are known and readily available at reasonable cost. Accordingly, in the preferred embodiment of the invention, it will be understood that the means 40 upon reed 20 will comprise a vane or shutter at least a portion of which is opaque to the passage of light therethrough, suitable physical constructions for such opaque vane or shutter means 40 being hereinafter discussed.

Figure 2:
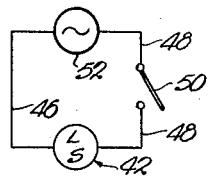
FIG. 2 illustrates a modified form of arrangement for providing the light source employed in the invention.

A radiation source is provided in the apparatus and is generally designated by the numeral 42. The exact nature of such source 42, would, of course, depend upon the particular type of radiation to be employed in practicing the invention. However, since in the preferred embodiment light rays are being used for the radiation whose path is to be interrupted by the means 40 oscillatable with vibratory reed 20, it will be understood that the radiation source schematically illustrated in FIG. 1, comprises merely any suitable light source. Among those that are available may be mentioned ordinary alternating current or direct current energized incandescent lamps and alternating current or direct current energized glow lamps of the gaseous and other types. Since such types of light source 42 require electrical energization, it is shown in FIG. 1 for illustrative purposes, a battery or source of direct current energization 44 coupled with the light source 42 through energizing circuit 46—48, there being an on-off switch 50 interposed in the energizing circuit 46—48. With such energizing means 44, it is apparent that a direct current energized light source 42 would be used. In FIG. 2 is schematically illustrated the alternative of employing an alternating current source or generator 52 for energizing an alternating current light source 42.

The apparatus also includes a radiation sensitive transducer 54 which is sensitive to the particular type of radiation being used to practice the invention and is characterized by having an electrical parameter thereof, which is adapted for coupling with an output circuit, subject to alteration or change depending upon the amount of the radiation that is imposed upon or applied to the transducer 54. In the preferred embodiment being described, transducer 54 may comprise some known form of photosensor or photoelectric device, which may be either of the photoemissive or self-generating type that creates an electrical potential thereacross and induces a flow of electrical current therethrough corresponding in amplitude to the amount of light applied thereto, or of what may be referred to as the variable impedance type wherein the resistance parameter or other electrical characteristics of the transducer 54 are altered and controlled by the amount of light being applied thereto.

FIG. 1 illustrates a photoelectric light detecting and transducing device of the self-generating type, which could be of construction utilizing the photovoltaic principle, and such photoelectric device 54 is, therefore, shown for illustrative purposes as directly coupled by circuit 56—58 with a pair of output terminals 60—62.

Figure 3:
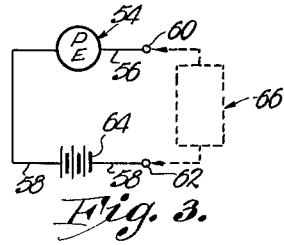
FIG. 3 illustrates a modified form of arrangement for coupling the photosensitive means with a circuit to be controlled.

FIG. 3 illustrates the alternative of employing a variable impedance type photoelectric transducer 54, which may be of the phototransistor, vacuum or gaseous photocell, photodiode cell, photoconductive cell or other constructions which require an energizing source for the circuit in which such transducer 54 is interposed and which it is intended to control. Accordingly, FIG. 3 illustrates a battery or direct current source 64 coupled in series with circuit 56—58 for providing such energization. It will be understood that a load shown in dotted lines in FIGS. 1 and 3 and generally designated 66 may be coupled across the output terminals 60 and 62 and, with the connections effected by circuit 56—58 comprises the output circuit to be controlled by the operation of the apparatus.

Figure 4:
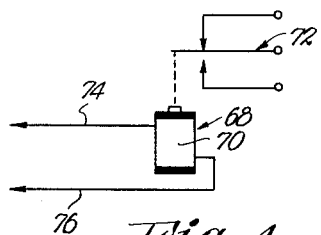
FIG. 4 illustrates one form of load to be controlled and which may be electrically coupled with the output of the circuit coupled with the photosensitive means forming a part of the apparatus when the apparatus is to be employed for controlling a switching function.
Figure 5:
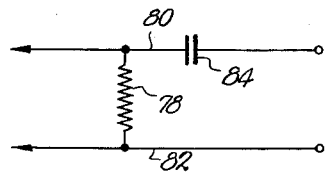
FIG. 5 illustrates a modified form of load which may be used when the apparatus is employed for filter purposes.
Figure 6:
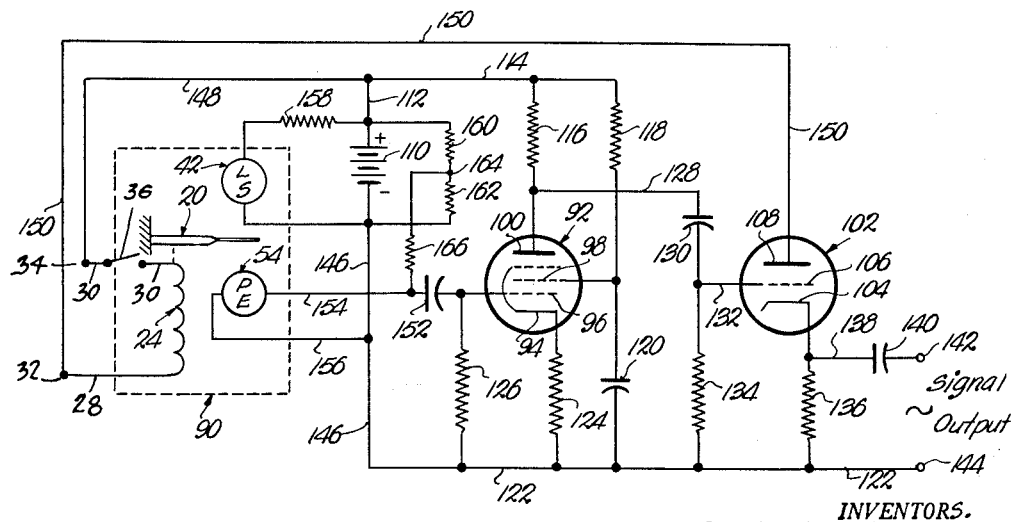
FIG. 6 is a schematic diagram illustrating an electronic oscillator circuit in which the apparatus contemplated by the invention is employed for frequency controlling purposes.

Manifestly, load 66 or the circuit to be controlled can be of almost any form capable of responding to changes in electrical potential or current flow between terminals 60 and 62. In perhaps the simplest case, the photosensitive transducer device 54 operates to perform a switching function between the terminals 60 and 62, or, if so arranged, to present a variable resistance or impedance between the terminals 60 and 62 which may be used for switching or other control functions. FIGS. 4, 5 and 6 illustrate further details of the manner in which the apparatus may be applied to the control of various types of load circuits or units. FIG. 4 shows a relay generally designated 68 having a coil 70 adapted to control the condition of a relay switch generally designated 72. The coil 70 may be coupled by conductive means 74 and 76 with terminals 60 and 62 respectively. Then, depending upon whether there is an electrical potential presented between terminals 60 and 62 by the transducer device 54, or whether the amount of radiation imposed upon transducer device 54 permits a given amplitude of current flow between the terminals 60 and 62, the coil 70 will be actuated to shift the switch 72 or leave the latter in its normal condition. Thus, by coupling an external circuit or piece of equipment to be ultimately controlled to the switch 72, it is clear that the apparatus of the invention is adapted for exerting such ultimate control over circuits and pieces of equipment which function at high voltage or high rates of current consumption, even though the nature of the transducer 54 might limit the potentials and currents within the circuit 56—58—74—76 to a lower value.

FIG. 5 illustrates one means of coupling to the output terminals 60 and 62 when the electrical potential or current being controlled by the transducer device 54 is being used directly as a frequency filtered output corresponding to an input of similar or harmonically related frequency being applied from the input source 38. Such coupling includes a shunt impedance in the nature of a resistance 78 which may be coupled between output leads 80 and 82 respectively connectable to the terminals 60 and 62, and an impedance in the nature of a capacitor 84 coupled in series with one of the leads 80. Those skilled in the art will appreciate that this presents a conventional form of alternating current output coupling means for coupling an output with utilization circuitry. It will be apparent that this type of alternating current load or output circuitry can be employed in filtering applications where signals of various or varying frequencies may be applied to the input terminals 32 and 34 and it is desired to deliver from the output terminals 60 and 62 a frequency filtered output which contains signal components of only that frequency corresponding to the mechanical resonance of reed 20, and which will be presented at output terminals 60 and 62 only during those periods when the input signals applied to input terminals 32 and 34 contain alternating current components of such resonant frequency of the reed 20. A filtering action is thereby performed by the apparatus.

FIG. 6 shows the employment of the apparatus of the invention as a frequency control means for an alternating current oscillator or signal generator, the frequency control apparatus being largely enclosed within a dotted box generally designated 90. Since the parts of apparatus 90 are generally the same as those hereinabove described in connection with FIG. 1 and are similarly numbered in FIG. 6, their individual descriptions will not be now repeated. Accordingly, the oscillator circuitry of FIG. 6 may be described as follows, although it will be understood that other embodiments of oscillator circuitry are equally adapted for use of the apparatus 90 as a frequency control means.

The oscillator includes a vacuum tube 92 having a cathode 94, a control grid 96, a screen grid 98 and a plate or anode 100, as well as a heater or filament (not shown). A second electronic tube 102 has a cathode 104, a control grid 106, and an anode or plate 108, as well as a filament (not shown). The tubes 92 and 102 may be coupled more or less conventionally for oscillator circuitry in that a positive potential voltage is applied from a battery or D.C. power source 110 a plate 110 of tube 92 through conductors 112 and 114 and a plate load resistance 116. Such positive voltage is similarly connected with the screen grid 98 of tube 92 through conductors 112 and 114 and a screen resistance 118, screen 98 also being by-passed through a condenser 120 to a common or ground connection 122. The cathode 94 of tube 92 is grounded through a cathode resistance 124 running to common or ground connection 122. Control grid 96 is provided with a control grid resistance 126 to provide for applying an electrical potential to grid 96 in relation to the potential of cathode 94 and ground 122. The output between the plate 100 and ground 122 of tube 92 will obviously be an amplified variation of the alternating current input applied between the grid 96 and ground 122 with the electrical polarity thereof reversed. Such output is coupled from plate 100 through conductor 128, a coupling capacitance 130 and conductor 132 to control grid 106 of tube 102, control grid 106 being provided with the usual resistance 134 to ground 122. Cathode 104 of tube 102 is grounded through a resistance 136 coupled to ground 122, which also serves as an internal load across which a cathode delivered output potential may be derived from the tube 102 between a conductor 138 coupled to cathode 104 and ground 122. An output coupling capacitor 140 is coupled in series with the output lead 138 to present the generated alternating current output between output terminal 142 and ground terminal 144. The output of tube 92 is further amplified by the tube 102 and its electrical polarity again reversed and presented between the plate 108 of tube 102 and ground 122, it being noted that the polarity of such amplified output is now in phase with the actuating input initially applied to control grid 96 of tube 92.

The high voltage direct current source 110 has its negative terminal connected to ground 122 by conductive means 146, and its positive terminal is coupled with plate 108 of tube 102 through conductors 112 and 148, reed actuating coil 24 and conductor 150. Since the coil 24 is interposed in series with the direct current connection from voltage source 110 to plate 108, it will be clear that the amplified alternating current output from plate 108 is also applied to the coil 24. This alternating current component of the electrical currents passed through coil 24 will, if of a proper frequency corresponding to the frequency of mechanical resonance of the reed 20, cause the latter to vibrate as hereinbefore described. Such vibration of reed 20 will in turn interrupt the transmission of light rays from the light source 42 to the photoelectric transducer device 54 at the same frequency at which reed 20 is vibrating. Battery 110 is coupled with light source 42 for energizing the latter through a voltage reducing resistance 158. Series connected resistors 160 and 162 coupled in shunt across direct current voltage source 110 provides a voltage dividing network for supplying from a tap 164 through a resistance 166, a potential to a conductor 154, coupled to transducer device 54 which is in turn oppositely coupled to ground 122 by conductive means 156 and 146. The current flow through such circuit just traced is modified and altered cyclically by the transducer 54 at the same frequency as reed 20 is vibrating. This presents upon conductor 154 an alternating current signal relative to ground 122 of such frequency, and that signal is coupled through a coupling capacitor 152 with the control grid 96 of tube 92. The arrangement thus provides for positive feedback from the output at plate 108 of tube 102 to the input at control grid 96 of tube 92 with such positive feedback being frequency selective or limited to the frequency at which reed 20 is mechanically resonant. Such arrangement will be understood by those skilled in the art because of the inherent instabilities involved to be self-initiating to commence oscillations at the frequency chosen, but it is significant that the overall oscillator apparatus is extremely stable with respect to frequency drift and has its frequency of oscillation continuously controlled by the apparatus 90, since upon any tendency of the output to drift in frequency from the natural resonant frequency of the reed 20, the positive feedback of such output to the reed vibrating coil 24 would be rendered less efficient or inoperative for vibrating the reed 20. Under these conditions, a frequency equilibrium occurs at the frequency of resonance of the reed 20, which then becomes the frequency controlling element of the entire oscillator unit.

Considering the circuit of FIG. 6 and when the switch 36 is closed, self-oscillation in the absence of an input signal applied to the terminals 32 and 34 may be suppressed by proper negative grid bias while maintaining plate potentials at a high value. Such action of cutting off vacuum tubes by raising the grid bias is well known in the electronics art. Or instead, the circuit may be prevented from breaking into self-oscillation by arranging the reed 20 when at standstill so that it cuts off all of the light from the photocell 54. Now the application of a signal of suitable frequency (the resonant frequency of the reed 20) will activate the circuit to operate in the aforementioned manner, and a control signal of appreciable magnitude will be available at the terminals 142 and 144, for any desired control purpose.

It will now be apparent that many of the important attributes and advantages of the invention are attributable to the general organization and combination of components and the operative relationships therebetween. It will also be manifest that the physical construction of suitable units for practicing the invention could assume a number of various forms. However, certain types of general construction have been tried and been found advantageous both from the standpoint of operability and that of providing the necessary structure with proper economy of space, weight and cost. Accordingly, it will be appropriate to describe illustrative physical constructions.

Figure 7:
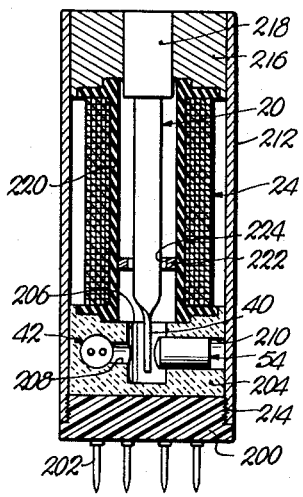
FIG. 7 is a central, cross-sectional view of a preferred form of physical construction that may be employed for providing a major portion of the apparatus contemplated by the invention in a small, compact, plug-in unit.

Referring therefore to FIG. 7, there is shown a currently preferred physical embodiment of structure required to present the apparatus contemplated by the invention. Such structure includes a plug-in type base 200 of insulating material provided with a number of conductive pins 202. Mounted on the base 200 is a body 204 having a more or less central chamber 206 open at the extremity thereof opposite plug 200 and provided with a pair of opposed cavities 208 and 210 extending from the chamber 206 in opposite directions. The light source or other radiant energy source 42 may be disposed in one of the cavities 208 while the photoelectric transducer or other radiation sensitive device 54 is disposed within the other cavity 210. Suitable electrical connections may be made from components 42 and 54 to different ones of the pins 202 in conventional manner. The structure may further include a cylindrical shell 212 adapted to be fitted upon the plug 200 and preferably threadably fastened thereto as at 214. An upper body portion 216 mounted adjacent the top of shell 212 rigidly mounts in any suitable manner as at 218 the upper end of a mechanically resonant, metallic, vibratory reed 20. The opaque means 40 of reed 20 is, in this case, formed by twisting the lowermost portion of reed 20 through a right angle. Means 40 extends into the chamber 206 between the light source 42 and the photoelectric transducer 54. Means 40 of reed 20 is adapted to traverse the path of light from source 42 to transducer 54 during vibration of reed 20 at its resonant frequency.

Means for vibrating the resonant reed are provided in the form of a coil 24 mounted in shell 212 upon a spool 220 depending from the body 218. Suitable electrical connections to the coil 24 (not shown) may be made to certain of the pins 202.

In the preferred construction an annular, permanent, polarizing magnet 222 is carried within the spool 220 and has a central opening 224 through which the metallic reed 20 extends. The magnet 222 is provided with opposite magnetic poles disposed along the line of swing of reed 20 during vibration thereof and at opposite ends of such swing. The purpose of the magnet 222 is to provide a magnetic bias upon the reed 20 during vibration thereof through the magnetic interaction between metallic reed 20 and the fixed, polarized flux field of magnet 222. Such fixed polarized flux field provided by magnet 222 presents a reference flux with which magnetic polarizations induced in reed 20 by the excitation of coil 24 may react. A smaller alternating magnetic flux from coil 24 may thus add to or subtract from the polarized reference flux provided by magnet 222 to synchronize the force applied to reed 20 with the frequency and waveform of the excitation applied to coil 24. Those skilled in the art will understand that other means for providing a reference or bias for the reed 20 and the magnetic flux from coil 24 acting thereon could be used. It will also be appreciated that the stored energy of permanent magnet 222 contributes to improving the sensitivity of the magnetic drive for reed 20.

Figure 8:
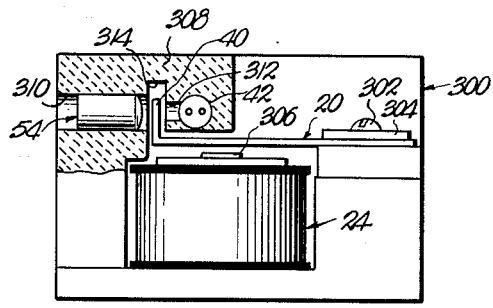
FIG. 8 is a plan view illustrating one modified form of physical construction which may be employed in practicing the invention, parts being broken away and shown in section for clarity.

Referring now to FIG. 8, another illustrative physical embodiment is shown in which the resonant reed 20 is secured to a base 300 by means such as a screw 302 and washer 304. The reed 20 is provided at its free end with means 40 in the form of a flange extending at right angles from the main plane of the reed 20. The coil 24 is mounted on the base 300 and provided with an armature 306 adapted to attract the reed 20 when the coil 24 is energized. A body portion 308 on base 300 is provided with opposed cavities 310 and 312 for receiving the transducer 54 and radiant energy source 42 respectively, said cavities 310 and 312 each entering upon a chamber 314 into which the radiation path traversing means 40 extends. It will be clear that as the reed 20 is vibrated, the means 40 is adapted to pass into and out of the path of radiation betwen source 42 and transducer 54.

Figure 9:
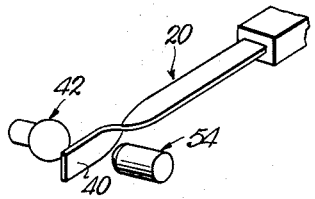
FIG. 9 is a fragmentary, perspective view illustrating schematically the relationship between the light source, the resonant reed and the photoelectric cell in a simple, currently preferred construction of the apparatus.

The means 40 of resonant reed 20 may be formed and disposed in various manners relative to the path of light between light source 42 and photoelectric transducer 54. FIG. 9 illustrates the simplest and currently preferred embodiment in which the angles of radiation and reception of source 42 and transducer 54 respectively are chosen and inherently established by those components in such manner that the opaque means 40 of reed 20 may simply move into and out of all or a part of the path of effective light travel between source 42 and transducer 54.

Figure 10:
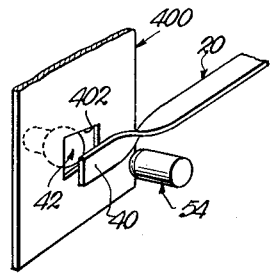
FIG. 10 is a fragmentary, perspective view schematically illustrating the relationship between the same parts as shown in FIG. 9 but wherein there is additionally provided an opaque screen having an aperture therein for more definitely defining the path of travel of a beam of light to be interrupted by the action of the vibratory reed.

FIG. 10 shows a somewhat refined embodiment in which there is additionally provided a screen generally designated 400 having an aperture 402 therein for limiting the path of travel of light from source 42 to transducer 54. In such embodiment, the opaque means 40 may be disposed in and correlated in its movement with the location of stationary aperture 402 to achieve the desired form of output from the transducer 54.

Figure 11:
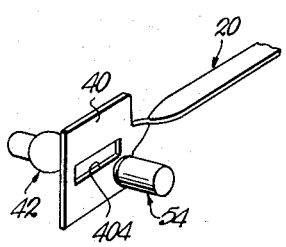
FIG. 11 is a fragmentary, perspective view schematically illustrating a modified form of construction in which the opaque means on the vibratory reed is provided with an aperture therethrough.

A further embodiment is illustrated in FIG. 11, wherein the means 40 and comprises a vane of somewhat greater expanse than in the previously described embodiments and which is itself provided with an aperture 404 therethrough for passing or transmitting light from source 42 to transducer 54. Since it will be appreciated that the opaque means 40 of embodiments such as in FIGS. 9 and 10 during a portion of their vibratory cycle are out of the path of travel between source 42 and transducer 54 they too are performing an equivalent light or radiation transmission function during those parts of the cycle, just as the aperture 404 of the embodiment of FIG. 11 serves to transmit light from source 42 to transducer 54 when its vibratory reed 20 is in a certain part of its cycle. Thus, the means 40 of all of the embodiments are adapted to alternately transmit and interrupt the passage of radiation from the source 42 to the transducer 54.

Figure 12:
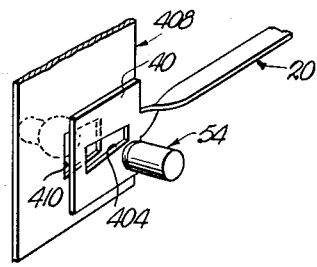
FIG. 12 is a fragmentary perspective view schematically illustrating parts similar to those shown in FIG. 11 but in which there is further provided a screen having a transmission path defining aperture therein.

A still further embodiment is illustrated in FIG. 12, which is similar in all respects to the embodiment of FIG. 11 except that there is provided a screen 408 having an aperture 410 therein for cooperation with the opaque vane 40 and particularly the aperture 404 of the latter. It will be noted that the apertures 410 and 404 are of trapezoidal rather than rectangular shape with the smaller base of the trapezoid closest to the fulcrum of vibratory swinging movement of the reed 20. It has been found that such trapezoidal shape, which may also be employed in the aperture 402 of the embodiment of FIG. 10, tends to provide an output from the transducer 54 of more nearly perfect sine wave characteristics, since it compensates for the angularity of movement of the means 40 as it swings with the reed 20 across the aperture in the screen 400 or 408. Where it is desired that the output of transducer 54 be conformed to some special characteristics or wave form pattern, the shape of the apertures mentioned or/and the means 40 themselves may be designed to accomplish such function.

It should also be pointed out at this juncture that the means 40 for alternately transmitting and interrupting the path of light traveling from source 42 to transducer 54 has been described for illustrative purposes as preferably employing some form of solid or apertured opaque vane. It will be apparent to those skilled in the art, and it is contemplated by this invention, that equivalent means for reflecting or refracting a beam of light or other radiation could be employed; for example, the means 40 could be constructed in the form of a mirror mounted on the reed 20 and the relative disposition of the light source 42 and photoelectric transducer 54 then selected to employ a reflective light transmission path rather than a straight one as shown for illustration in the described embodiments. The use of a mirror, for example, rather than an opaque vane for the means 40 could be desirable in special circumstances such as where, for constructional reasons, it was necessary or desirable for both the source 42 and the transducer 54 to be pointed in the same direction or in the same direction or in intersecting directions not directly opposing each other.

The relationship between the wave form and frequency of the input to terminals 34 and 32, which control the frequency of resonant vibration of the reed 20, to the frequency and wave form of the electrical output from the terminals 60 and 62 can be predetermined and varied in certain respects by the relationship between the path of light between source 42 and transducer 54 and the positioning of the means 40 during different parts of the cycle of operation and the standby or nonvibratory condition of the reed 20. FIG. 13 illustrates the currently preferred arrangement for obtaining from a sine wave input of given frequency equal to the resonant frequency of the reed 20 an output also of sine wave form and of the same frequency. The curve 500 illustrates the variation of electrical polarity of an input signal applied to terminals 32 and 34 with time. The curve 502 shows the electrical output being simultaneously derived from the output terminals 60 and 62. The five illustrations between the curves 500 and 502 show the relative dispositions of the vane means 40 and the path of travel of light from source 42 to transducer 54, which is represented as being defined by an aperture 402. Considering first the topmost illustration of the relative disposition between opaque means 40 and aperture 402, such parts are shown in the relative dispositions they would occupy when the associated vibratory reed 20 is at rest, that is, not vibrating, or when the input signal is at its electrical null. It will be seen that such disposition permits a certain amount of light to travel from the source 42 to the transducer 54 which results in an electrical output at the terminals 60 and 62 of level indicated at 504 on the curve 502 and also by the line 506 associated with the curve 502. As the input shown by curve 500 reaches a peak in one polarity, as at 508, the illustration of the opaque means 40 and the aperture 402 second from the top in the figure shows that the opaque means 40 has been moved during the course of vibration of reed 20 to a position fully clearing aperture 402 for full transmission of light from source 42 to transducer 54. This produces a corresponding peak in the output shown by curve 502 as indicated at 510. When the input 500 returns to an electrical null as at 512, the means 40 and aperture 402 return to their initial disposition as shown in the illustration third from the top in the figure and result in an electrical output as at 514, which it will be noted is of the normal or stand-by level 506. As input 500 reaches a peak as at 516 in the opposite polarity, the opaque means 40 is completely covering the aperture 402 to block the transmission of light from source 42 to transducer 54, as shown in the fourth illustration from the top in the figure, and this results in a corresponding low peak as at 518 in the output shown in curve 502. The bottom illustration in the figure then shows the opaque means 40 and the aperture or light path 402 in their relative disposition as the reed 20 carries the means 40 back through the normal position occurring when the output is at a null as at 520, and this results in return of the output to level 506 as at 522. It will be appreciated by those skilled in the art that the same relative arrangement between a radiation path and a means 40 for alternately transmitting and blocking the passage of light along such path can be accomplished with various types or combinations of vane means 40 of either apertured or non-apertured type and in conjunction with arrangements of source 42 and transducer 54 employing or not employing radiation path defining, apertured screens.

Another arrangement adapted for producing a doubled output, that is an output at terminals 60 and 62 of twice the frequency of the input to terminals 32 and 34 and twice the frequency of vibration of the reed 20 is illustrated in FIG. 14. Again, the polarity and amplitude of the input is indicated by the curve 500 having the same significant points 508, 512, 516 and 520 as described in connection with FIG. 13. The output from terminals 60 and 62 is in this case generally indicated by the curve 550 shown to the right of curve 500. The five illustrations between the curves 500 and 550 again show successive relative dispositions between an opaque means 40 and a light or other radiation path schematically represented by an aperture 402. Referring to the topmost of the latter illustrations, it will be seen that, in this case, the means 40 is disposed in the stand-by or nonvibratory condition of the reed 20 so as to substantially completely interrupt or block the passage of radiations from the source 42 to the transducer 54. Accordingly, for such condition the electrical output from terminals 60 and 62 will be at a null or minimum value indicated as at 552. The illustration which is second from the top in FIG. 14 shows the relative position of the means 40 to the light path or aperture 402 at the time that the input 508 is peaked in one polarity thereof, and it will be seen that the means 40 is in this case swung to a position completely clearing the path 402, which results in a corresponding peak 554 in the output illustrated by curve 550. In this construction, when the input 500 returns to a null as at 512, the means 40 returns to its initial position completely blocking the radiation path 402, and output 550 similarly returns to a minimum or null value as at 556. As the cycle of vibration of the reed continues, means 40 then moves out of blocking relation to the path 402 on the opposite side thereof as shown in the illustration fourth from the top in the figure. The maximum swing of means 40 in this direction occurs as the input peaks with opposite polarity as at 516 and, since the light path 402 is again completely opened, another peak of output will occur as at 558 which has the same electrical polarity as the previous electrical output peak 554.

As the input completes its cycle by returning to a null value as at 520, the means 40 again returns to a position completely blocking the aperture or radiation path 402 and the output 550 similarly returns to a minimum or null level as at 560. It can now be seen from curve 550 that same constitutes a pulsating output of twice the frequency of the input curve 500 and the vibratory frequency of the reed 20 which carries opaque means 40. Such output 550 is not in perfect sine wave form but may be used in the form shown for many purposes or may be translated into substantially sine wave form by conventional means known to those skilled in the electrical arts.

It will now be appreciated that the invention is well adapted to achieve all of the aforementioned objects and advantages thereof. It will also be obvious, however, that a number of minor variations and modifications can be made from the precise details of the structure disclosed as preferred for illustrative purposes without departing from the true spirit and intent of the invention. Accordingly, the invention should be deemed limited only by the scope of the claims that follow.

Having thus described the invention what is claimed as new and desired to be secured by Letters Patent is:

1. Control apparatus for effecting a switching action in response to the attainment by a source of electrical energy of a predetermined frequency, comprising in combination:
   (a) first electrical circuit means to be controlled;
   (b) radiation sensitive means characterized by the property that an electrically significant parameter thereof is subject to alteration responsive to imposition of radiation upon said radiation sensitive means;
   (c) means electrically coupling said radiation sensitive means with said first electrical circuit means for control of said first electrical circuit means upon alteration of said electrically significant parameter of said radiation sensitive means;
   (d) radiation source means;
   (e) shiftable radiation transmitting means arranged relative to said radiation source means and said radiation sensitive means for imposing radiation from said radiation source means upon said radiation sensitive means and for varying the amount of radiation imposed by said radiation source means upon said radiation sensitive means responsive to shifting of said radiation transmitting means;
   (f) a second electrical circuit means adapted for coupling with means for energizing the same, to exert control over said first electrical circuit means;
   (g) operating means operably coupled with said shiftable radiation transmitting means for shifting the latter when said operating means is actuated, said operating means including an electrical circuit electrically coupled with said second electrical circuit means for actuation of said operating means responsive to the condition of energization of said second electrical circuit means;
   (h) an output circuit connected to the said second electrical circuit means; and
   (i) input terminals connected with the said electrical circuit of said operating means and adapted for connection to the source of electrical energy whose frequency is to effect the said switching action.

2. An apparatus as in claim 1, wherein:
   (a) the said shiftable means comprises an oscillatable opaque piece which in its position of rest blocks radiation from the radiation source to the radiation sensitive means.

3. An apparatus as in claim 2, wherein:
   (a) for the position of rest of the opaque piece the said operating means remains inoperative to shift said piece in the absence of an input of proper frequency applied to the said input terminals.

4. An apparatus as in claim 1, wherein:
   (a) the said shiftable means comprises an oscillatable opaque piece having a path of travel which enables it to interrupt radiation from the radiation source to the radiation sensitive means, and
   (b) the opaque piece blocks radiation from the radiation source to the radiation sensitive means when it is substantially at the center of said path of travel.

5. An apparatus as in claim 1, wherein:
   (a) the said shiftable means comprises an oscillatable opaque piece having a path of travel which enables it to interrupt radiation from the radiation source to the radiation sensitive means, and
   (b) the opaque piece blocks radiation from the radiation source to the radiation sensitive means when it is substantially at one end of said path of travel.

6. An apparatus as in claim 1, wherein:
   (a) one of said electrical circuit means comprises a vacuum tube which is biased to cut off and which remains inoperative in the absence of an input of proper frequency applied to the said input terminals.

References Cited in the file of this patent

UNITED STATES PATENTS

| | | |
|---|---|---|
| 1,631,021 | Dowling | May 31, 1927 |
| 1,962,207 | McL. Nicolson | June 12, 1934 |
| 1,962,609 | McL. Nicolson | June 12, 1934 |
| 2,625,659 | Mendelson | Jan. 13, 1953 |
| 2,753,754 | Le Clair | July 10, 1956 |
| 2,795,736 | Dilks | June 11, 1957 |